(No Model.)
E. WOOD.
GARDEN CULTIVATOR.
No. 522,868. Patented July 10, 1894.
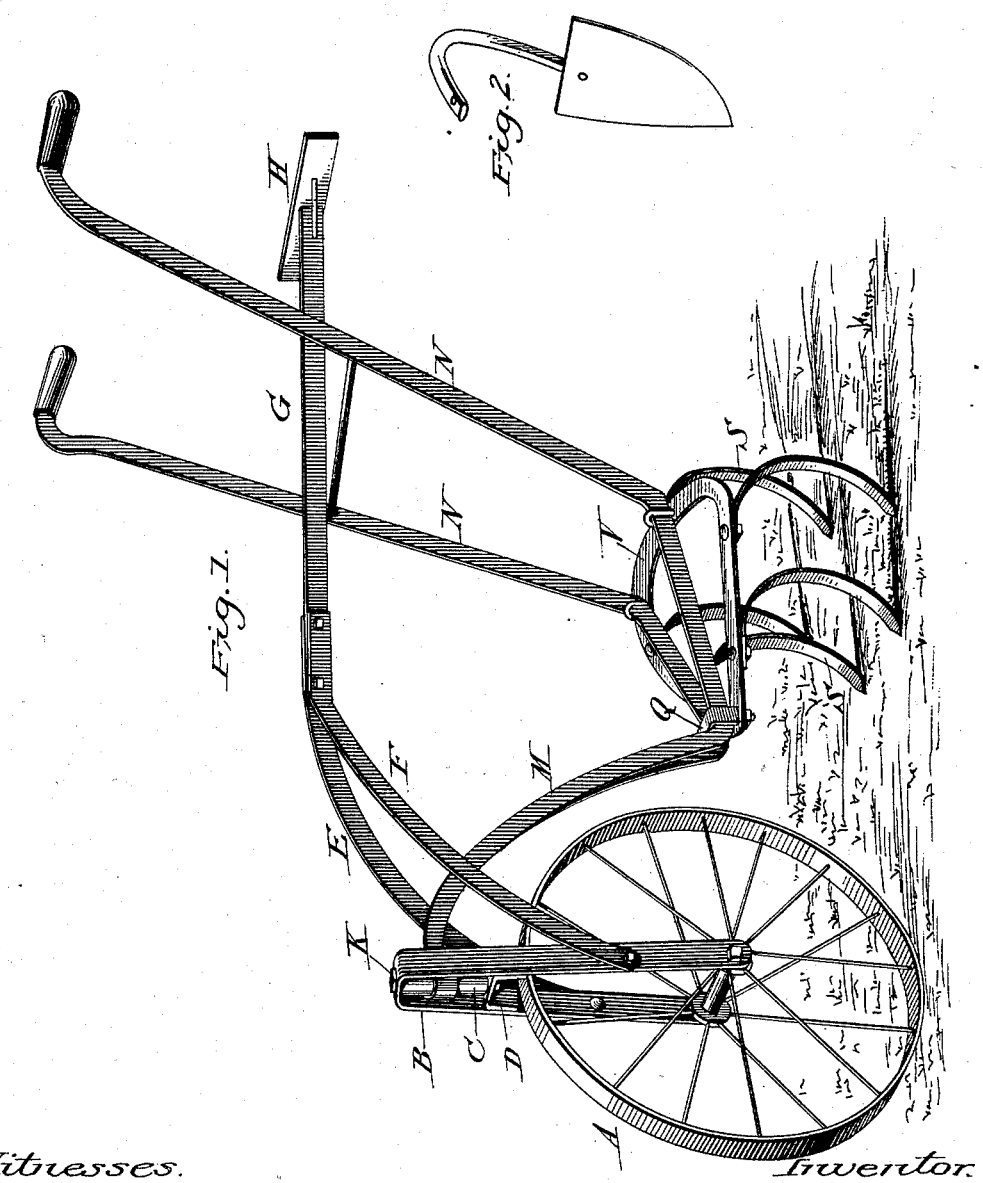
Witnesses.
Elwood Hunt
Clinton Murphy
Inventor.
Erastus Wood

UNITED STATES PATENT OFFICE.

ERASTUS WOOD, OF MARSHALL, INDIANA.

GARDEN-CULTIVATOR.

SPECIFICATION forming part of Letters Patent No. 522,868, dated July 10, 1894.

Application filed July 31, 1893. Serial No. 482,036. (No model.)

*To all whom it may concern:*

Be it known that I, ERASTUS WOOD, a citizen of the United States, residing at Marshall, in the county of Parke and State of Indiana, have invented a new and useful Garden-Cultivator to be Used and Operated by Man-Power, of which the following is a specification.

Figure 1, is a perspective view of my machine. Fig. 2, is a view of the removable shovel.

A. represents the wheel.

B, represents the arch spanning the wheel and resting on the axle.

C represents a section of gas pipe running from the top of the arch B to a cross bar in the arch, two inches below.

D represents the cross bar aforesaid.

K represents a bolt passing through the top of arch B. down through gas pipe C and screwing into cross bar D.

G represents the breast bar upon which the breast plate is attached.

H. represents the breast plate aforesaid to push against with the body.

E and F represent arms or branches connecting breast bar G with and on each side of arch B at the middle thereof.

M represents a beam clasped around gas pipe C and running back and down behind wheel A to clamp O thence spreading back and upward forming the handles N N.

V represents a triangular shaped continuous bar attached to beam M by a bolt passing through clasp O and by hook bolts on handles N N.

S represents five spring teeth attached to the triangular shaped continuous bar V. The shovel plow, Fig. 2, can also be attached in the place of the rear tooth and used as a single plow, by removing all the teeth.

What I claim as my invention, and for which I desire Letters Patent, is—

1. The combination in a hand cultivator of a wheel, an axle, an arch seated upon the axle and spanning and rising above the wheel, a bar swiveled in the arch above the wheel and extending downward and then upward to form handles and to receive a cultivator frame, substantially as shown and described.

2. The combination of the wheel and axle the arch spanning the wheel and carrying above it the vertical swivel post the bar swiveled to the post and extending downward to receive the cultivator frame and thence upward forming the handles, the frame carrying the cultivator teeth and the breast bar having its branches pivoted to either side of the arch, substantially as described.

ERASTUS WOOD.

Witnesses:
ELWOOD HUNT,
CLINTON MURPHY.